United States Patent [19]

Krick et al.

[11] 3,813,558

[45] May 28, 1974

[54] DIRECTIONAL, NON-VOLATILE BISTABLE RESISTOR LOGIC CIRCUITS

[75] Inventors: Paul John Krick, Katonah; Peter Pleshko, Crugers, both of N.Y.

[73] Assignee: International Business Machines Corporation, Armonk, N.Y.

[22] Filed: June 26, 1972

[21] Appl. No.: 266,173

[52] U.S. Cl. ......... 307/221 R, 317/234 V, 307/206, 307/286

[51] Int. Cl. ........................................... G11c 11/36

[58] Field of Search ........ 307/206, 286, 322, 221 B; 317/234 R

[56] References Cited

UNITED STATES PATENTS

| | | | |
|---|---|---|---|
| 2,944,164 | 7/1960 | Odell et al. | 307/221 B |
| 3,027,464 | 3/1962 | Kosonocky | 307/286 X |
| 3,075,087 | 1/1963 | Lo | 307/286 X |
| 3,152,264 | 10/1964 | Ergott et al. | 307/286 X |
| 3,162,776 | 12/1964 | Gerlach et al. | 307/221 B |
| 3,206,618 | 9/1965 | Kallman | 307/286 |
| 3,229,114 | 1/1966 | Balder et al. | 307/206 |
| 3,324,308 | 6/1967 | Alford | 307/206 X |
| 3,436,601 | 4/1969 | Dyre | 317/234 V |
| 3,573,757 | 4/1971 | Adams | 317/234 V |
| 3,656,029 | 4/1972 | Ahn et al. | 317/234 R |

*Primary Examiner*—John S. Heyman
*Attorney, Agent, or Firm*—Thomas J. Kilgannon, Jr.

[57] ABSTRACT

A circuit consisting of a pair of bistable resistors connected in series at a node to which current may be applied and from which current may be drawn and having a source of potential connected to each bistable resistor is disclosed. The bistable resistors are oriented physically in the same direction such that current in a given direction which exceeds a threshold and which switches the bistable resistors into a high resistance state can be characterized as the forward direction. Conversely, current in the opposite direction to the given direction which, when it exceeds a threshold, switches the devices from a high resistance state into a low resistance state can be characterized as the backward direction. With appropriately applied potentials to each of the bistable resistors, with one potential more positive than the other, current can be made to flow in the forward and backward directions. In the forward direction, both resistors are switched into or remain in a high resistance or RH state. When current flows in the backward direction through the pair of bistable resistors, they switch into or remain in the low resistance or RL state. By applying the same potentials to the bistable resistors and causing current to flow into or out of the node at which the bistable resistors are connected, it is possible to cause the pair of resistors to assume a low resistance high resistance state and, a high resistance low resistance state, respectively. Thus, by simply controlling the potentials and the direction of current flow through each of the pair of bistable resistors, four, non-volatile, stable states are achievable as opposed to a maximum of two volatile states in similarly arranged tunnel diode circuits, for example. Because the arrangements shown are inexpensive, easy to fabricate and permit high packing densities, circuits such as shift registers which utilize large numbers of similarly arranged logic circuits are most attractive. In addition, the nanosecond switching speeds available in bistable resistors make them superior to other known switching devices of slower switching speed. A shift register circuit incorporating three of the four non-volatile, stable states available with the logic circuits is also disclosed. The shift register utilizes a low resistance-high resistance state to represent a binary "one" and a high resistance-high resistance state and a high resistance-low resistance state to represent a binary "zero."

10 Claims, 10 Drawing Figures

HJD1 - LOW
HJD2 - HIGH

HJD1 - LOW
HJD2 - LOW

HJD1 - HIGH
HJD2 - HIGH

HJD1 - HIGH
HJD2 - LOW

DIRECTIONAL, NON-VOLATILE BISTABLE RESISTOR LOGIC CIRCUITS

BACKGROUND OF THE INVENTION

1. Field of the Invention

This invention generally relates to solid state switching devices which have two non-volatile stable states which are dependent on the direction of current flow in excess of thresholds therethrough. More specifically, it relates to a logic circuit which is capable of assuming four non-volatile, stable states which consists of pairs of bistable resistors connected to a node at which current may be applied or at which current may be withdrawn to cause one of the pair of resistors to enter a high resistance state and the other to enter a low resistance state. A condition where both bistable resistors are in a high resistance state is achieved by causing current to flow through both devices in a direction which causes the bistable resistors to switch into or remain in a high resistance state. Current flow in the appropriate direction is achieved by applying potentials, one more positive than the other, to the resistors. By reversing the potentials, current can be caused to flow in a direction different from the first mentioned direction, in excess of a threshold, which causes the pair of bistable resistors to switch into or remain in a low resistance state.

Still more specifically, the invention relates to a shift register arrangement incorporating the above mentioned logic circuits and utilizing three of the four available non-volatile, stable states. The recognition that the switching of a logic circuit from a high resistance-low resistance state to a high resistance-high resistance state is not deleterious to the operation of the shift register permits the use of such devices where ordinarily one would not utilize them because of the switching of the bistable resistor when current flows through it in a forward direction. The approach utilized in the present invention, overcomes a potential disadvantage by permitting switching and by simultaneously controlling the resistance of the bistable element when it switches from its low resistance state. The circuits may be utilized as logical inverters in regimes where cost, density, speed and fabrication requirements place other devices at a disadvantage.

2. Description of the Prior Art

Logic circuits such as pairs of tunnel diodes are known in the prior art. However, such devices are volatile unless appropriately biased as opposed to the present circuits which require no bias to remain in a stable, non-volatile condition. Also, tunnel diode series arrangements of pairs of such devices are unable to carry out an inversion function unless reactive elements such as inductors are combined with them. The use of reactive elements such as inductors which are not practical to fabricate in the integrated circuit environment militates against widespread use of such logical arrangements. The circuits of the present invention require no reactive elements and can be utilized in the integrated circuit environment. Finally, tunnel diodes have switching thresholds in a single quadrant of their IV characteristics, whereas the bistable devices of the present invention have switching thresholds in two quadrants of their IV characteristics. Thus, while there may appear to be a relationship between tunnel diodes and the bistable resistors of the present application, such relationship is only superficial and bears no relationship to the manner in which the different devices function. The present circuits are capable of performing Boolean logic functions such as AND, OR and INVERT and can be activated with a finite number of pulsed sources where transfer of information from state to state is required.

SUMMARY OF THE INVENTION

The logic circuit of the present invention, in its broadest aspect relates to a circuit which includes first and second bistable resistors connected in series at a node. Each of the resistors has a characteristic such that current in one direction in excess of a threshold causes the resistor to switch to a high impedance state and current in a direction opposite to the first direction in excess of a threshold causes the resistors to switch to a low impedance state. In its broadest aspect, the circuit further includes means connected to the circuit for either passing current through the resistors in one direction in excess of a threshold or passing current in a direction opposite to the first direction in excess of a threshold, or simultaneously passing current through one of the resistors in the first direction in excess of a threshold and through the other resistor in a direction opposite to the first direction in excess of a threshold to cause the resistors to assume states where both resistors are high impedance, where both resistances are low impedance or where one resistor is high impedance while the other resistor is low impedance, respectively.

In accordance with more specific aspects of the present invention, the means for passing current through the resistors in one direction in excess of a threshold includes reference voltage means connected to one of the bistable resistors and voltage means positive relative to the reference voltage means connected to the other of the bistable resistors.

In accordance with more specific aspects of the present invention, the means for passing current through the resistors in a direction opposite to the first direction in excess of a threshold includes reference voltage means connected to the first bistable resistor and voltage means positive relative to the reference voltage connected to the other of the bistable resistors.

In accordance with still more particular aspects of the invention, the means for passing current through one of the resistors in the first direction in excess of a threshold and through the other of the resistors in a direction opposite to the first direction in excess of a threshold includes voltage means of substantially equal magnitude connected to the first and second resistors and current means connected to the node for either applying current to or removing current from the node to cause the resistors to switch into a high or low impedance state when the current is in the first direction or in the opposite direction, respectively, in the first and second bistable resistors, respectively.

In accordance with still more specific aspects of the invention, the high resistance value of one of a pair of bistable resistors is adjusted to be lower than the high resistance value of the other of the pair of bistable resistors so that when the first resistor switches as a result of current through it in the forward direction, and when the second bistable resistor is in a high resistance state, the voltage drop across the first resistor is substantially reduced and a greater part of the voltage which was present at the node when the first bistable resistor was in the low resistance state, still appears at the node.

In accordance with yet more specific aspects of the invention, the logic circuit wherein one of the bistable resistors has a lower high resistance state than the other is incorporated into a shift register stage and means are connected thereto for resetting the logic circuit into a given binary condition; means are connected thereto for changing its binary condition; and, means are connected thereto for transferring the information stored in the logic circuits to a succeeding logic circuit.

The apparatus summarized hereinabove provides a logic circuit arrangement which is capable of assuming four stable states which are non-volatile. Also provided is a logic circuit which is capable of representing the same binary condition in two different resistance states, that is, a high resistance-low resistance state with current in the forward direction through the low resistance device and a high resistance-high resistance state with current in the same direction through the former low resistance bistable resistor.

It is therefore an object of the present invention to provide a logic circuit incorporating pairs of bistable resistors which have four stable, non-volatile states.

Another object is to provide logic circuits which are capable of being utilized in high speed, inexpensive, high packing density circuit arrangements.

Still another object is to provide a shift register circuit incorporating the logical circuits mentioned hereinabove which utilize three out of the four available stable non-volatile resistance states.

The foregoing and other objects and features of the present invention will be apparent from the following more particular description of preferred embodiments as illustrated in the accompanying drawings.

DESCRIPTION OF A PREFERRED EMBODIMENT

Figure 1:
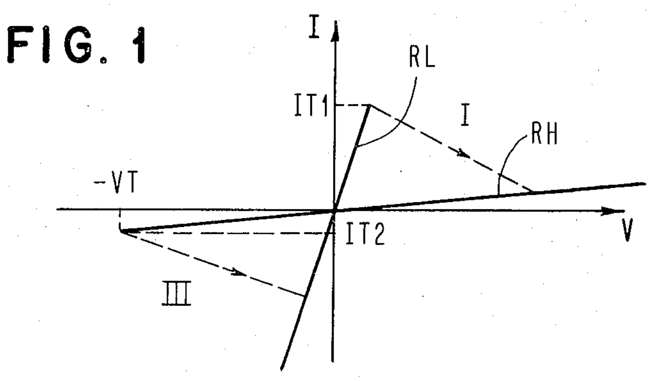
FIG. 1 is a plot of the current-voltage characteristic of a bistable resistor having two stable resistance states, a high resistance state, RH, and a low resistance state, RL. If the device was originally in the RL state, when current in the forward direction exceeds a threshold IT1, it causes the resistor to switch into and remain in a high resistance state. If the device is in the RH state, current in a direction opposite to the first direction in excess of a threshold IT2 causes the bistable resistor to switch into or remain in a low resistance state. Switching occurs only in quadrant I and quadrant III.

Referring now to FIG. 1, there is shown therein a voltage current characteristic of a bistable resistor which may be utilized in the practice of the present invention. Bistable resistors which are well known to those in the switching arts typically have switching characteristics similar to those shown in FIG. 1. A bistable resistor, if it is in the low resistance state, RL in FIG. 1, switches to a high resistance state, RH in FIG. 1, when a threshold current IT1 is reached. If the bistable resistor is already in the high resistance state, current in the same direction as IT1 does not affect the bistable resistor and it remains in the high resistance state. Switching from the low resistance state to the high resistance state takes place in quadrant I in the plot of FIG. 1. When current is applied in a direction opposite to IT1, the bistable resistor switches from a high resistance state when a threshold voltage −VT in FIG. 1 is exceeded to a low resistance state. The current associated with the threshold −VT is indicated at IT2 in FIG. 1. Switching from a high resistance state to a low resistance state takes place in quadrant III of the plot of FIG. 1. From the foregoing, then, it should be clear that current passed through a bistable resistor in a given direction which switches it from the low resistance state to the high resistance state can be characterized as the forward direction. Similarly, a current in a direction opposite to the first direction which causes a bistable resistor to switch from a high resistance state to a low resistance state can be characterized as passing current in the backward direction. In connection with FIG. 1, it should be noted that bistable resistors have threshold conditions in two quadrants as opposed to the single quadrant thresholds of other two terminal devices, such as tunnel diodes. It should also be recalled in the same connection, that the states achieved are non-volatile and require no biasing to maintain them in the state into which they have been switched.

Figure 2A:
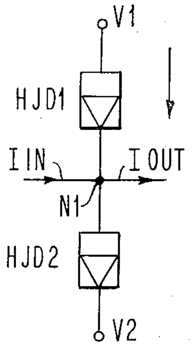
FIG. 2A is a schematic diagram of a pair of bistable resistors having the characteristics shown in FIG. 1 connected in series at a node. Conductors are connected to the node for applying current to or removing current from the node. In addition, a voltage source is shown connected to each bistable resistor.

Referring now to FIG. 2A, there is shown therein a pair of bistable resistors HJD1, HJD2 connected in series at a node N1. A source of potential labelled V1 is shown connected to resistor HJD1 while a source of potential, V2 is shown connected to resistor HJD2. Current paths labelled I IN and I OUT are shown connected to Node N1 and these conductors apply current to Node N1 and remove current from Node N1 respectively. Bistable resistors HJD1, HJD2 are physically oriented such that current in the direction of the arrow in FIG. 2A switches both of the bistable resistors into a high resistance state if the resistors are not already in that state. The direction of the arrow, therefore, indicates what may be characterized as the forward direction of current. A current in a direction opposite to the direction of the arrow in FIG. 2A switches bistable resistors HJD2 and HJD1 into a low resistance state from a high resistance state if the resistors are not already in that state. A direction opposite to the direction of the arrow may be characterized as the backward direction of current. In both the forward and backward directions, switching occurs once a threshold has been exceeded. From the foregoing, it should be clear that current may be applied in the forward direction by making V1 more positive than V2. Thus, for example, V1 may be a positive voltage while V2 may be at ground potential. Under such circumstances, if IT1 is exceeded for both devices, both bistable resistors HJD1 and HJD2 are switched into or remain in a high resistance state shown as Rh in quadrant I of FIG. 1. By applying a positive potential to V2 and a lower potential at V1, current is passed through resistors HJD2 and HJD1 in the backward direction. Under such circumstances, if the threshold −VT had been exceeded, both resistors switch from a high resistance state or remain in a low resistance state. This condition is shown at RL in quadrant III of FIG. 1.

With sources V1 and V2 at the same potential and current applied to Node N1 via a conductor I IN from a source (not shown), current may be applied in the forward direction to resistor HJD2 and in the backward direction to resistor HJD1. Under such circumstances, when current in HJD2 exceeds a threshold equal to IT1 in FIG. 1, HJD2 switches into a high resistance state. At this point, the voltage on Node N1 rises to a point where the threshold voltage −VT across HJD1 and its associated threshold current IT2 are exceeded and HJD1 switches from a high resistance state into a low resistance state. If the devices are already in the states previously indicated, no switching occurs and the devices merely maintain their states. Under the foregoing conditions, it is possible to simultaneously achieve a low resistance state for resistor HJD1 and a high resistance state for resistor HJD2.

By applying the same potentials to sources V1 and V2 and removing current from Node N1 via conductor I OUT to a current sump (not shown), the direction of current flow in devices HJD1 and HJD2 is reversed from the condition where current was supplied to Node N1 via conductor I IN. Under these circumstances where current flows out of Node N1 via conductor I OUT, current flows in the forward direction in HJD1 and in the backward direction in HJD2 causing those devices to assume the high resistance and low resistance states, respectively. From the foregoing, therefore, it should be clear that four different states are obtainable using a series arrangement of bistable resistors having characteristics similar to those shown in FIG. 1. The states are a) a high resistance-high resistance state, b) a low resistance-low resistance state, c) a low resistance-high resistance state, d) a high resistance-low resistance state for devices HJD1 - HJD2, respectively.

As a result of being able to change the state of bistable resistors HJD1, HJD2, it is possible to perform Boolean logic functions including AND, OR and inversion.

Figure 2B:
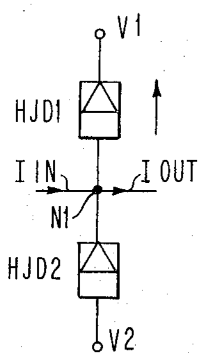
FIG. 2B is a circuit which is identical with that shown in FIG. 2A except that the bistable resistors are reversed.
Figure 3A:
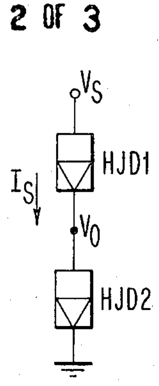
FIGS. 3A–3E show an inverter circuit having a current flow $I_s$ from a source $V_s$ to ground through two bistable resistors and plots of the various possible resistance states obtainable for the bistable resistors indicating that four stable states are obtainable, respectively.
Figure 3B:
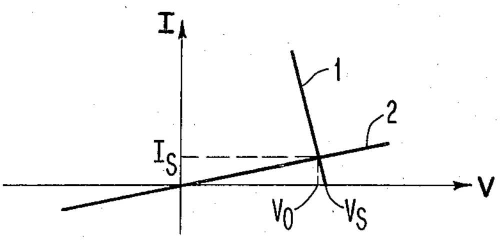
Figure 3C:
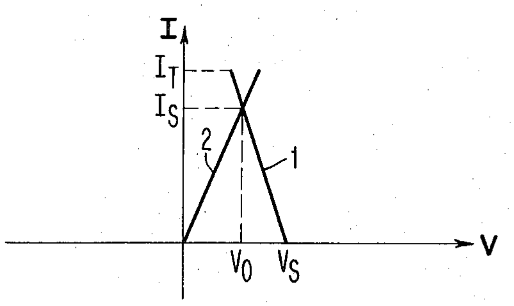
Figure 3D:
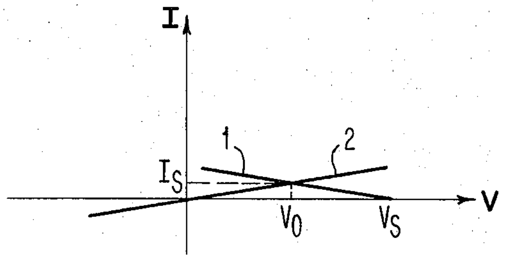
Figure 3E:
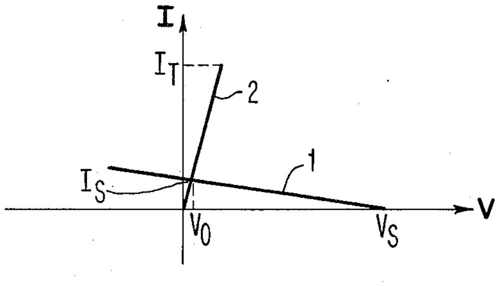

Referring now to FIG. 2B there is shown therein a pair of bistable resistors HJD1, HJD2, connected in series at a Node N1 which is identical with the arrangement shown in FIG. 2A except that the direction of the bistable resistors is reversed. Under such circumstances, when V2 is more positive than V1, current flows in the forward direction as indicated by the arrow in FIG. 2B switching both resistors into a high resistance state, and when V1 is more positive than V2 current flows in the backward direction switching both resistors into a low resistance state. Also, current into Node N1 via I IN switches HJD1 into the high resistance state and resistors HJD2 into the low resistance state when V1 and V2 are at the same potential. Finally, current out of Node N1 via I OUT when V1 and V2 are at the same potential, causes HJD2 to assume the high resistance state and HJD1 to assume the low resistance state. FIG. 2B does no more than indicate that by reversing the direction of the bistable resistors, the same voltage and/or current conditions produce the opposite effects from that discussed in connection with FIG. 2A. FIG. 3A shows a circuit arrangement similar to that shown in FIG. 2A after it has been placed in one of the four states described in connection with FIG. 2A. FIG. 3A represents a steady state condition with devices HJD1 and HJD2 in either a high or low resistance state providing the conditions: low resistance — high resistance, low resistance — low resistance, high resistance — high resistance, high resistance — low resistance, respectively, for HJD1 and HJD2, and, represented in FIGS. 3B–3E, respectively. Thus, the current $I_s$ in FIG. 3A is determined by the states assumed by devices HJD1 and HJD2 and the voltage source $V_s$. FIG. 3C represents the I–V characteristics when devices HJD1 and HJD2 are both in the low resistance state and shows the maximum steady state current obtainable. The value of $I_s$ should not be greater than the threshold current $I_t$, otherwise devices HJD1 and HJD2 would switch under steady state conditions. $V_o$ is the potential at a point between devices HJD1 and HJD2 and represents a stable condition in each of the FIGS. 3B–3E. Load lines 1, 2 show the I-V characteristics for devices HJD1 and HJD2, respectively, and the intersection of load lines 1, 2 is the stable condition $V_o$ in FIGS. 3B–3E. FIG. 3D shows the minimum current value $I_s$ as would be expected from a pair of high resistances in series. FIGS. 3B and 3E permit a higher current $I_s$ to flow than in the minimum current condition of FIG. 3D. It should be noted in FIGS. 3B and 3E that while the current $I_s$ is the same in both plots, the stable condition $V_o$ is at a higher potential in FIG. 3B than in FIG. 3A. The plot of FIG. 3E is a mirror image of the plot of FIG. 3B. From the foregoing, it should be clear that the circuit arrangements of FIGS. 2A, 2B during steady state operation have four stable states all of which are governed by the resistance conditions of the bistable resistors HJD1 and HJD2. A shift register arrangement shown in FIG. 4 consists of two stages, the components of a single stage being shown in dashed line box 10. The object of the arrangement is to condition node N1 to show either a binary "1" or binary "zero" state as represented by the presence of a high or low potential, respectively, on node N1 when information is to be transmitted from one stage to the next succeeding stage.

Figure 4:
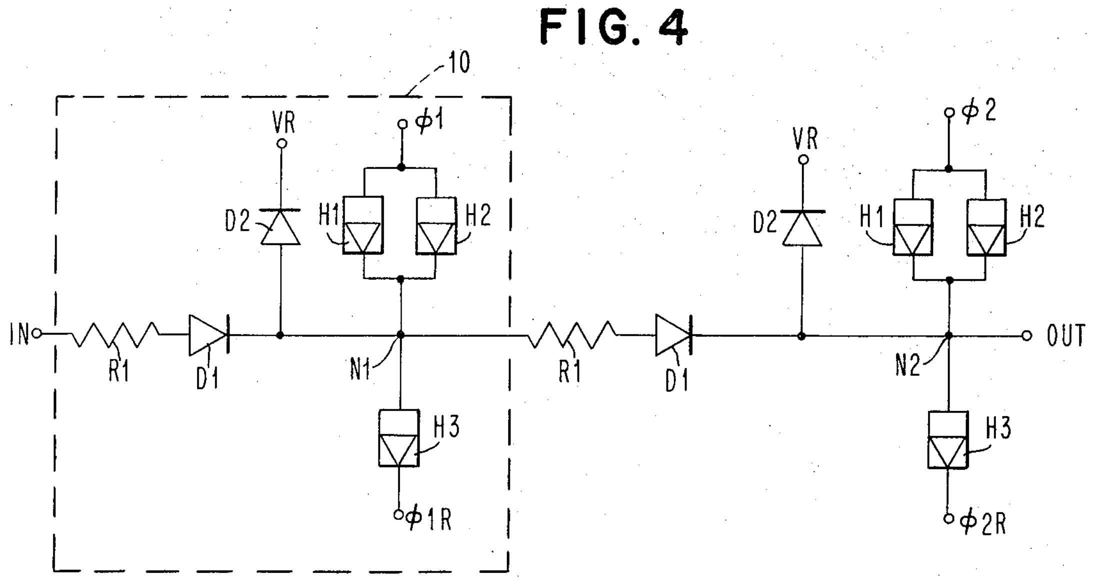
FIG. 4 is a shift register circuit having first and second states, each of which incorporate a modified version of the logical circuit shown in FIG. 2A.

Referring now to dashed line box 10 of FIG. 4 a terminal labeled IN is connected to node N1 via a current limiting resistor R1 and by a diode D1 which is arranged to prevent the passage of current from node N1 to terminal IN. Node N1 is disposed between a bistable resistor H3 and bistable resistors H1, H2 which are connected in parallel to node N1. Bistable resistors H1, H2 are connected in parallel to a source of pulsed voltage $\phi 1$ while H3 is connected to another pulsed voltage source labeled $\phi 1R$. H1, H2 and H3 are arranged to form a shift register stage which performs the same function as other shift register stages with the exception that it has four stable states as opposed to the two stable states of usual circuits and discussed hereinabove in connection with FIGS. 2A and 2B. A diode D2 connected in parallel with bistable resistors H1, H2 is connected to a pulsed voltage source VR and forms a unidirectional current path for setting the next stage formed by resistors H1, H2 and H3 in an initial state. It should be appreciated that H1, H2 could be substituted for by a single bistable resistor with a current threshold greater than IT1 for a single device or, H2 can be removed and a resistor placed in parallel with diode D2 of approximately the same resistance as R1. The parallel pair H1, H2 have been utilized to provide for fan-out capability. The parallel arrangement also permits the use of bistable resistors all of which have the same characteristics. In this way, special fabrication techniques are eliminated.

In FIG. 4, a succeeding shift register stage 11 shown outside of dashed line box 10, is identical with the arrangement shown within box 10 with the exception that the various pulsed voltage sources have been given different reference characters to more easily identify their outputs and times of activation when the operation of the circuit of FIG. 4 is discussed hereinbelow in conjunction with the pulse patterns of FIG. 5. Thus, pulsed source VR is connected to diode D2; pulsed source $\phi 2$ is connected to bistable resistors H1, H2 and, pulsed source $\phi 2R$ is connected to bistable resistor H3. Also, the node between resistors H1, H2 and H3 has been identified as node N2. Finally, the output terminal of shift register stage 11 of FIG. 4 is labeled OUT.

Figure 5:
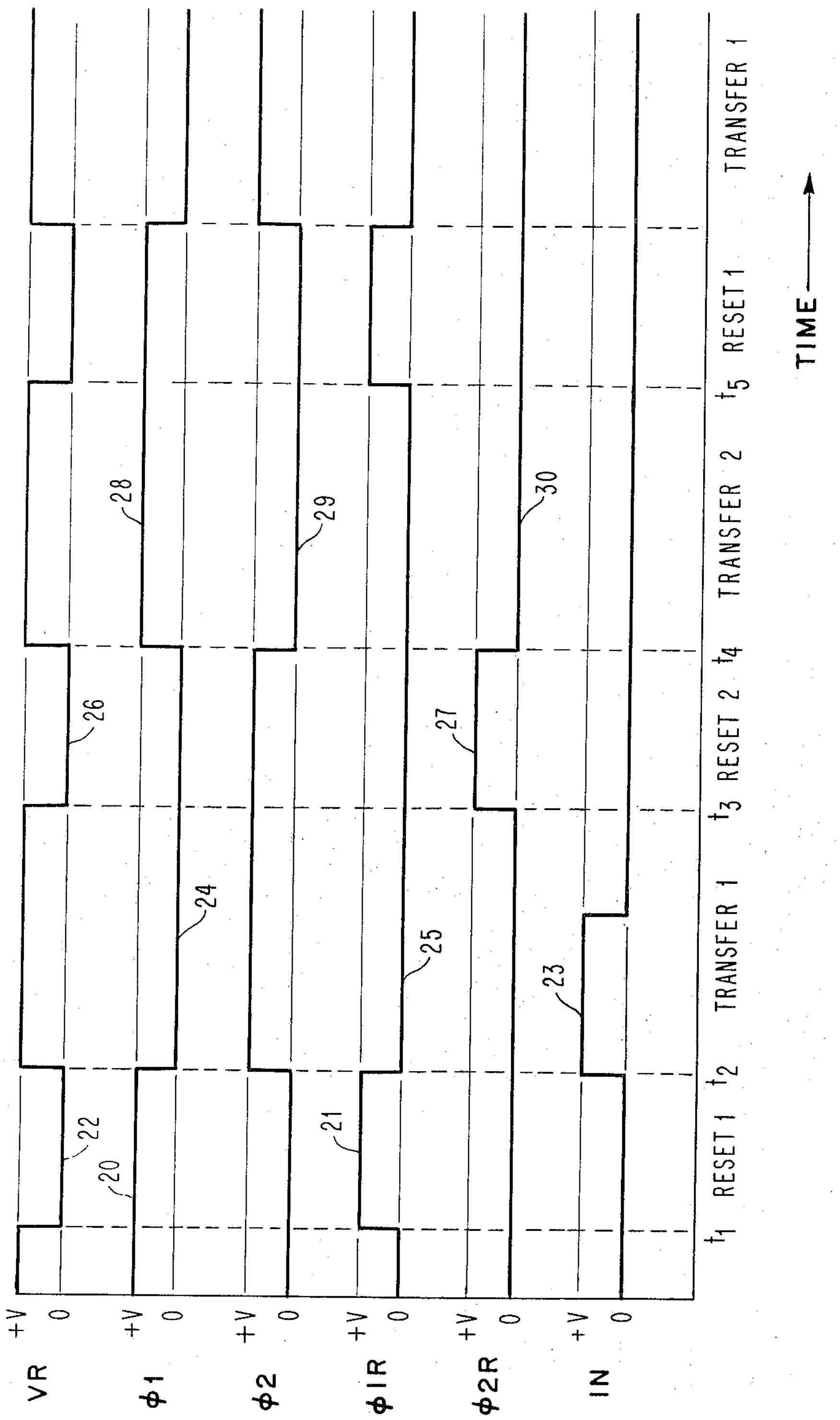
FIG. 5 is a representation of the pulse patterns applied to various terminals similarly labelled in the circuit arrangement of FIG. 4.

In operation, the arrangement of FIG. 4 is activated by the pulse pattern shown in FIG. 5 during the time periods shown.

Regardless of the state bistable resistors H1, H2, H3 are in, these devices are reset during the time period $t1$–$t2$ shown in FIG. 5. The arbitrary reset condition for the bistable resistors H1, H2 and H3 of stage 10 is H1, H2 in the high resistance state (hereinafter termed the RH state) and H3 in the low resistance state (hereinafter termed the RL state). Referring to FIG. 2A, it should be clear from the previous discussion in connection with FIG. 2A that removing current from node N1 with V1 and V2 at substantially the same potential causes current to flow in HJD1 toward node N1 and similarly in HJD2 toward node N1. The current in HJD1 in excess of the threshold current IT1 causes HJD1 to switch into the RH state while current in excess of a threshold IT2 causes HJD2 to switch into the RL state.

The last-mentioned condition is duplicated in FIG. 4 by setting pulsed sources $\phi 1$ and $\phi 1R$ to the same potential +V during the reset interval $t1$–$t2$ and otherwise indicated in FIG. 5 as RESET 1. Note from FIG. 5 that pulsed source $\phi 1$ starts the reset interval $t1$–$t2$ at the potential +V otherwise identified in FIG. 5 by reference character 20. Pulsed source $\phi 1R$ enters the reset interval $t1$–$t2$ at zero potential and is immediately pulsed to +V potential and is otherwise identified in FIG. 5 by the reference character 21. With $\phi 1$ and $\phi 1R$ at the potential +V, pulsed source VR is pulsed from the potential +V to ground potential, shown at 22 in FIG. 5, during the reset interval $t1$–$t2$. Under these conditions, current flows from sources $\phi 1$ and $\phi 1R$ in parallel to VR via node N1 and diode D2. Diode D1 blocks current flow from passing to terminal N1. Establishing current flow in the direction indicated causes H1, H2 to assume a RH state while H3 assumes a RL state and, the shift register stage formed from bistable resistors H1, H2 and H3 is in a reset condition.

At the same time, node N2, of stage 11, is clamped to ground by D2 which is held at ground potential by VR. Thus, H1, H2 and H3 of stage 11 are unaffected.

At the beginning of interval $t2$–$t3$ otherwise referred to as TRANSFER 1 in FIG. 5, a positive pulse 23 of potential +V is applied to terminal IN of the shift register stage within box 10. At the same time, the potentials of pulsed sources $\phi 1$ and $\phi 1R$ shown at 24, 25, respectively in FIG. 5, are dropped to ground potential. The potential of VR which had been returned to +V after dropping the ground potential 22 for a portion of the interval $t1$–$t2$, remains at potential +V. The application of a positive pulse 23 of potential +V in conjunction with the application of ground potential 24, 25 by pulsed sources $\phi 1$ and $\phi 1R$ to shift register stage 10 at node N1 causes current to be applied to node N1. This is analogous to the situation discussed in connection with FIG. 2A where IN is caused to flow into node N1 when the potentials V1, V2 are at the same potential. Then, current flows out of N1 through HJD2 to V2 and through HJD1 to V1. When current through HJD2 exceeded a threshold, if it were in a high resistance state, it remained in that state or, it it were in a low resistance state, it switched into the high resistance state. Similarly, once HJD2 assumed the high resistance state, the voltage at node N1 began to rise, until a threshold voltage with its associated threshold current was reached, at which point HJD1 switched into a low resistance state, if it were not already in that state.

Thus, in FIG. 4, current is driven out of node N1 to pulsed source $\phi 1R$ via H3, as a result of a positive potential 23 at terminal IN, causing H3 to assume the RH state. When the voltage rises at node N1 as a result of H3 assuming the RH state, current flows to pulsed source $\phi 1$ and, when a threshold $-VT$ is reached, H1, H2 switch into a RL state causing ground potential to appear at N1 since $\phi 1$ is at ground potential 24 and remain there during the interval $t2$–$t3$. It should be recalled that H1, H2 were in a RH state and that H3 was in a RL state as a result of activation during the RESET 1 interval, $t1$–$t2$. The application of a positive pulse 23 to IN in FIG. 5, "writes" a binary "one" into the shift register stage within box 10. Keeping ground potential on terminal IN during the writing interval, of course, leaves H1, H2 and H3 in the reset condition since no currents flow and a binary "zero" is written. These designations are arbitrary and could be reversed without departing from the spirit of the invention.

Assuming that H1, H2 are in the RL state and that H3 is in a RH state, a binary "one" is present in the shift register stage in dashed line box 10. After positive potential 23 has been removed from terminal IN, pulsed sources $\phi 1$ and $\phi 1R$ are maintained at ground potential for the remainder of the $t2$–$t3$ interval and during the interval $t3$–$t4$, otherwise referred to as RESET 2 in FIG. 5. The latter interval is the reset interval for shift register stage 11. VR is at a positive potential during the interval $t2$–$t3$. Current flow to the other pulsed sources $\phi 1$, $\phi 1R$ and IN which are grounded is prevented by the presence of diodes D1, D2. Thus, shift register stage within box 10 remains in the state which was determined by the potential (+V or ground) at terminal IN.

During the RESET 2 interval $t3$–$t4$ for stage 11, VR drops to ground potential which is identified by reference character 26 in FIG. 5. At the same time, pulsed source $\phi 2$, is held at +V and pulsed source $\phi 2R$ is pulsed to +V and shown at 27 in FIG. 5. Under these conditions, current flows into node N2 from pulsed sources $\phi 2$, $\phi 2R$ via bistable resistors H1, H2 and H3. Current thru H1, H2, when it exceeds the device threshold, causes bistable resistors H1, H2 to switch into an RH state. (Another way of characterizing current direction is to define the forward direction of current as that current in excess of a threshold which switches the resistor into an RH state. Conversely, the backward direction of current can be defined as that current in excess of a threshold which switches the resistor into an RL state.) Current through H3 toward N2 is in the backward direction and causes H3 to switch into the RL state when a threshold voltage is exceeded. In this manner, then, stage 11 is reset preparatory to transferring information from the stage within box 10 during the interval $t4$–$t5$, otherwise shown as TRANSFER 2 in FIG. 5.

During the interval $t4$–$t5$, pulsed source VR is returned to the potential +V. Pulsed sources $\phi 1$ and $\phi 2$ are pulsed to +V and ground, respectively, and their potential levels are identified in FIG. 5 by the reference characters 28, 29, respectively. At the same time, pulsed source $\phi 2R$ is pulsed to ground potential, as shown at 30 in FIG. 5, while $\phi 1R$ remains at ground potential shown at 25 in FIG. 5. With all the pulsed sources at ground potential with the exception of pulsed sources $\phi 1$, and VR, current flows from pulsed source $\phi 1$ through bistable resistors H1, H2 (which are in the RL state) to node N2 via resistance R1 and diode D1 of stage 11. Upon reaching node N2, current passes through resistor H3 in the forward direction to pulsed source $\phi 2R$ which is at ground. Bistable resistor H3 switches to the RH state when current in the forward direction exceeds a threshold and, node N2 rises toward the potential +V of pulsed source $\phi 1$. At this point, current in the backward direction through H1, H2, when it exceeds a threshold, switches H1, H2 into the RL state.

From the foregoing description, it should be clear that a positive pulse initially applied at terminal IN switches the H1, H2 and H3 devices of stage 10 from a reset condition so that when transfer of information occurs, a positive potential from pulsed source $\phi 1$ is applied to node N2 causing currents to flow which cause switching in the bistable resistors of stage 11. If the potential applied to terminal IN were ground potential, the bistable resistors within box 10 would not switch and, when a positive potential from pulsed source $\phi 1$ is applied during the transfer interval, ground potential appears at nodes N1 and N2 causing the bistable resistors of stage 11 to remain in their reset condition. Thus, two possible states are obtainable depending on the input at terminal IN using the same pulse patterns as shown in FIG. 5. To obtain an output at terminal OUT, pulsed source $\phi 2$ is pulsed to +V with pulsed source $\phi 2R$ at ground potential. If H1, H2 of stage 11 are in the RH state while H3 is in the RL state, ground potential appears at terminal OUT. If H1, H2 are in the RL state while H3 is in the RH state, a positive potential appears at terminal OUT. The states of the bistable resistors of stage 11 are, of course, determined by the input at terminal IN.

Until this point, little has been said concerning the parallel arrangement of bistable resistors H1, H2. They are arranged in this way as a design expedient. Consider the situation in FIG. 2A, where HJD1 is in a RL state and HJD2 is in a RH state. When V1 is pulsed to some positive potential and V2 is held at ground, current flow in HJD1 to some load connected to IOUT which is connected to ground potential causes HJD1 to switch to a RH state when the device threshold is exceeded. Under such circumstances, the potential appearing on node N1 is V1/2 since the value of resistance for HJD1 and HJD2 are substantially the same. To avoid having to design circuits which operate between the limits V1 and V1/2, the expedient of placing two bistable resistors in parallel has been utilized. This same function can be achieved by putting a linear resistor in parallel with HJD1. Thus, in FIG. 4, resistors H1, H2 in parallel provide sufficient current output capability.

A problem exists when a stage storing a binary "1" is followed by two stages storing a binary "0". In this case, transferring the "1" to the succeeding stage triggers the third stage into a RH — RH state. However, the RH — RH state is equivalent to the RH - RL state as far as operation of the shift register is concerned. From this, it can be seen that a binary "0" state can have two conditions:

a. where H1, H2 are in the RH state and H3 is in the RL state
b. where H1, H2 are in a RH state and H3 is in a RH state. However, in this state, the RH state of H1, H2 and H3 limits the current to below IT1 and hence cannot transfer a "1" to the succeeding stage. It should also be clear that the binary "1" state has only one condition, that is, where H1, H2 are in the RL state and H3 is in the RH state. Another way of designing the circuit of FIG. 3 is to provide a single bistable resistor for the parallel combination of H1, H2 having a larger threshold current. From the foregoing, it should be clear that advantage has been taken of three of the four possible non-volatile stable states of the bistable logic circuits shown in FIGS. 2A, 2B to provide a shift register arrangement which heretofore was not considered viable in the bistable resistor environment. As a result of the use of two stable conditions for the respresentation of the single binary state, it is possible to provide circuits which are fast, economical, high density and capable of being integrated.

As has been indicated hereinabove, any well known bistable resistors may be utilized in the practice of the present invention. For example, gallium nitride-silicon heterojunction devices having the following characteristics may be utilized in the shift register of FIG. 4:

IT = 1m a
−VT = −0.5 volt
RH = $2 \times 10^6$ ohms
RL = 100 ohms

In addition, resistor R1 may be equal to 1,000 ohms and diodes D1 may be any standard diode.

Finally, it should be appreciated that while the embodiment of FIG. 4 has been shown using two phases, a different number of phases, for example, three or more phases may be utilized.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A shift register circuit comprising at least first and second shift register stages each of said shift register stages including at least first and second bistable resistors connected in series at a node said bistable resistors having a characteristic such that current in one direction in excess of a threshold causes said resistor to switch to a high resistance state and such that current in a direction opposite to said one direction in excess of a threshold causes said resistor to switch into a low resistance state, means connected to said first and second shift register stages for setting said first and second bistable resistors thereof in a high resistance-low resistance state, respectively, during respective first and second reset intervals, means connected to said first shift register stage for applying signals representative of binary information to cause said first and second bistable resistors to assume one of the states, low resistance-high resistance respectively, and remaining in the state assumed during said first reset interval, means connected during a transfer interval to said first and second bistable resistors of said first and second stages for transferrring a signal representative of a binary "1" and a binary "0" from said first stage to said second stage causing said first and second resistors of said second stage to assume one of the states, low resistance-high resistance, respectively, and remaining in the state assumed during said second reset interval, and another bistable resistor connected in parallel with said first bistable resistor of said first and second stages.

2. A shift register stage in accordance with claim 1 further including means connected to said first and second bistable resistors of said second stage for applying a signal representative of binary information to an output.

3. A shift register stage in accordance with claim 2 wherein said means connected to said first and second bistable resistors of said second stage includes a pulsed voltage source at positive potential connected to said first resistor and a pulsed voltage source at reference potential connected to said second resistor.

4. A shift register stage according to claim 1 wherein said means for setting said first and second bistable resistors in a high resistance-low resistance state, respectively, includes first and second pulsed sources connected to said first and second resistors held at positive potential and another pulsed source held at ground potential connected to said node via diodes.

5. A shift register stage according to claim 4 further including a resistance connected in parallel with said diodes.

6. A shift register stage according to claim 1 wherein said means for applying signals includes a pulsed current source adapted to apply one of current and no current to said node of said first stage during a clocked transfer interval via a diode and a current limiting resistor.

7. A shift register stage according to claim 1 wherein said means connected to said first and second bistable resistors of said first and second stages for transferring a signal from said first stage to said second stage includes first and second pulsed voltage sources connected to said first and second stages said first voltage source connected to said first stage being at a positive potential and said second voltage source connected to said first stage and said first and second voltage sources connected to said second stage being at reference potential during said transfer interval said nodes being connected via a diode and current limiting resistor.

8. A shift register according to claim 1 wherein said first and second bistable resistors having the same high and low resistance values.

9. A shift register according to claim 1 wherein said first bistable resistor has a lower high resistance value than said second bistable resistor.

10. A shift register in accordance with claim 1 wherein said first and second and said another bistable resistor have the same high and low resistance values.

* * * * *